Oct. 26, 1943.   R. THORESON ET AL   2,333,056
TURRET TYPE INJECTION PRESS
Filed Dec. 16, 1940   6 Sheets-Sheet 5
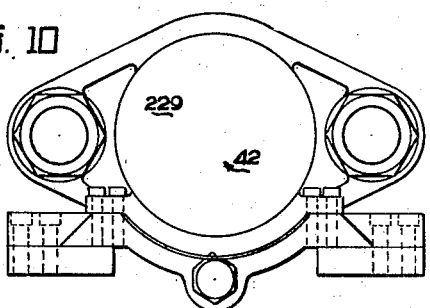
FIG. 10
FIG. 9
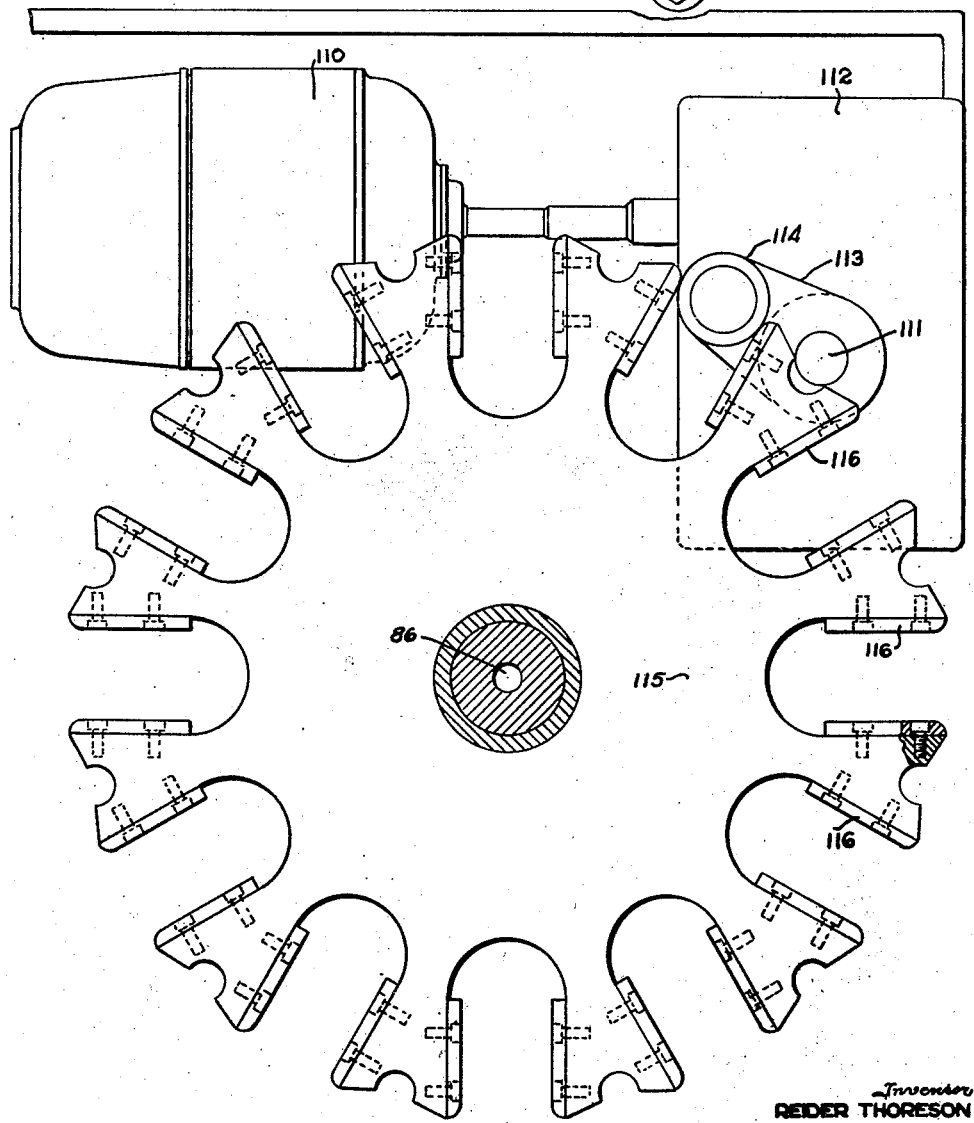
Inventor
REIDER THORESON
WALTER ERNST
Attorneys

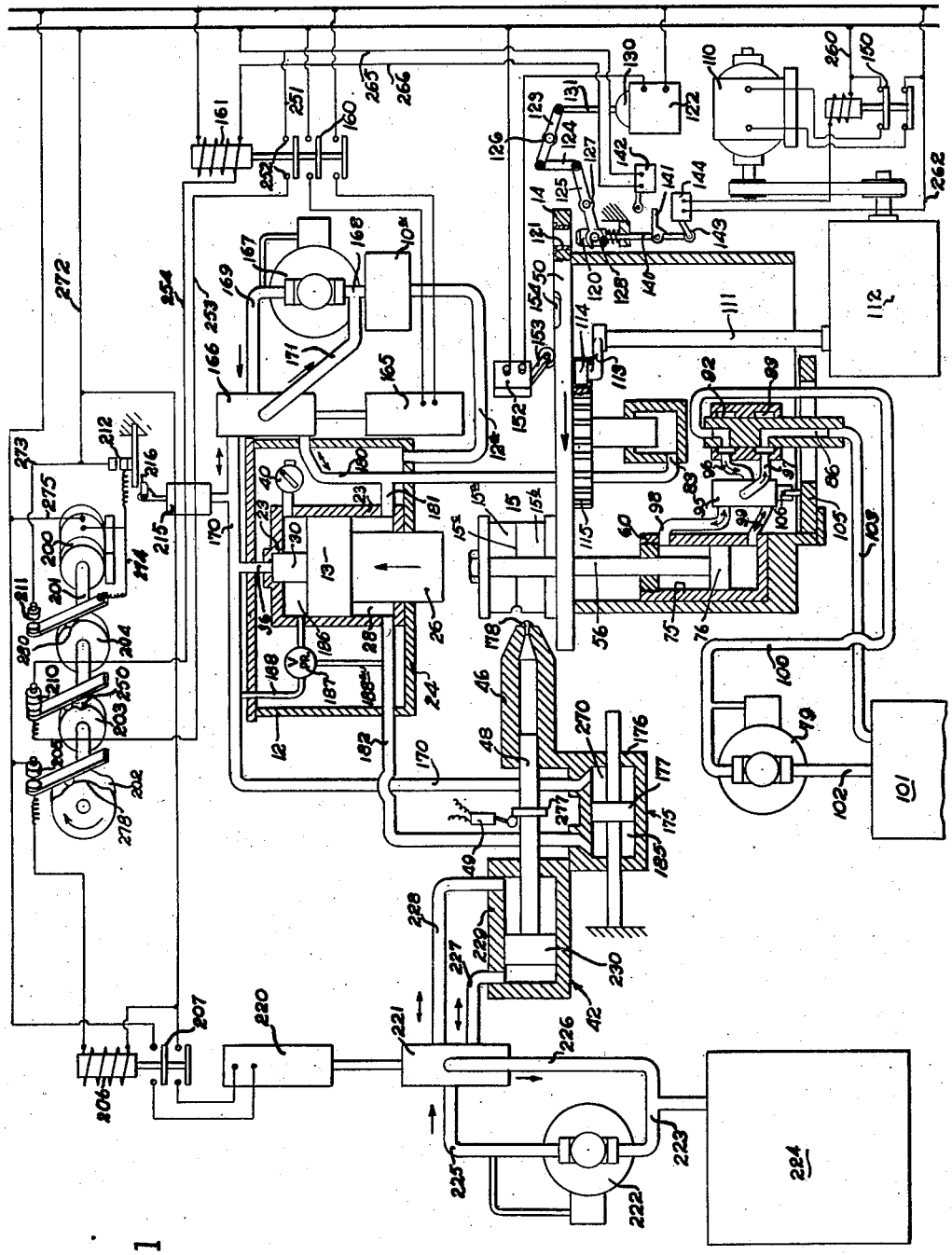

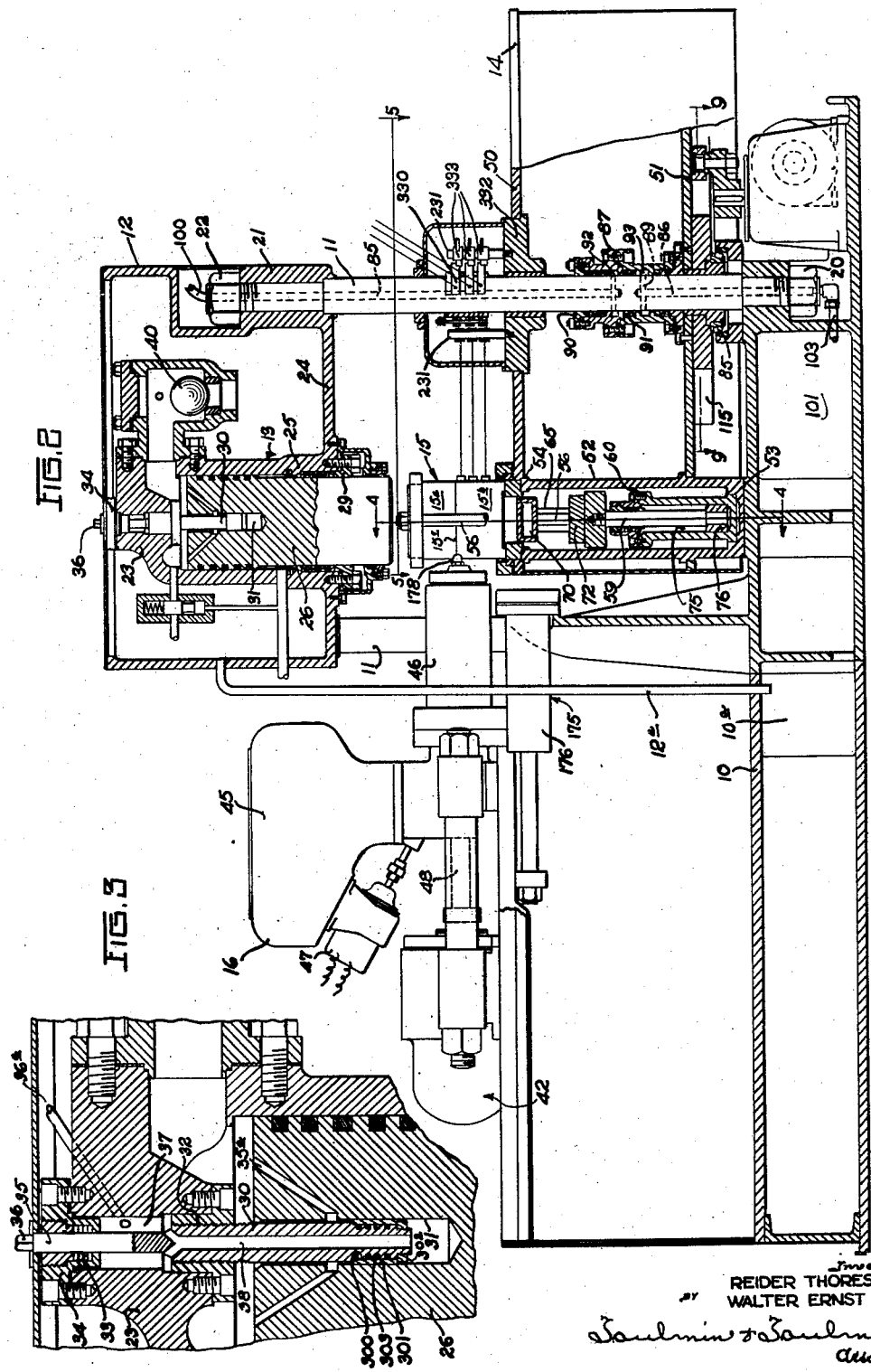

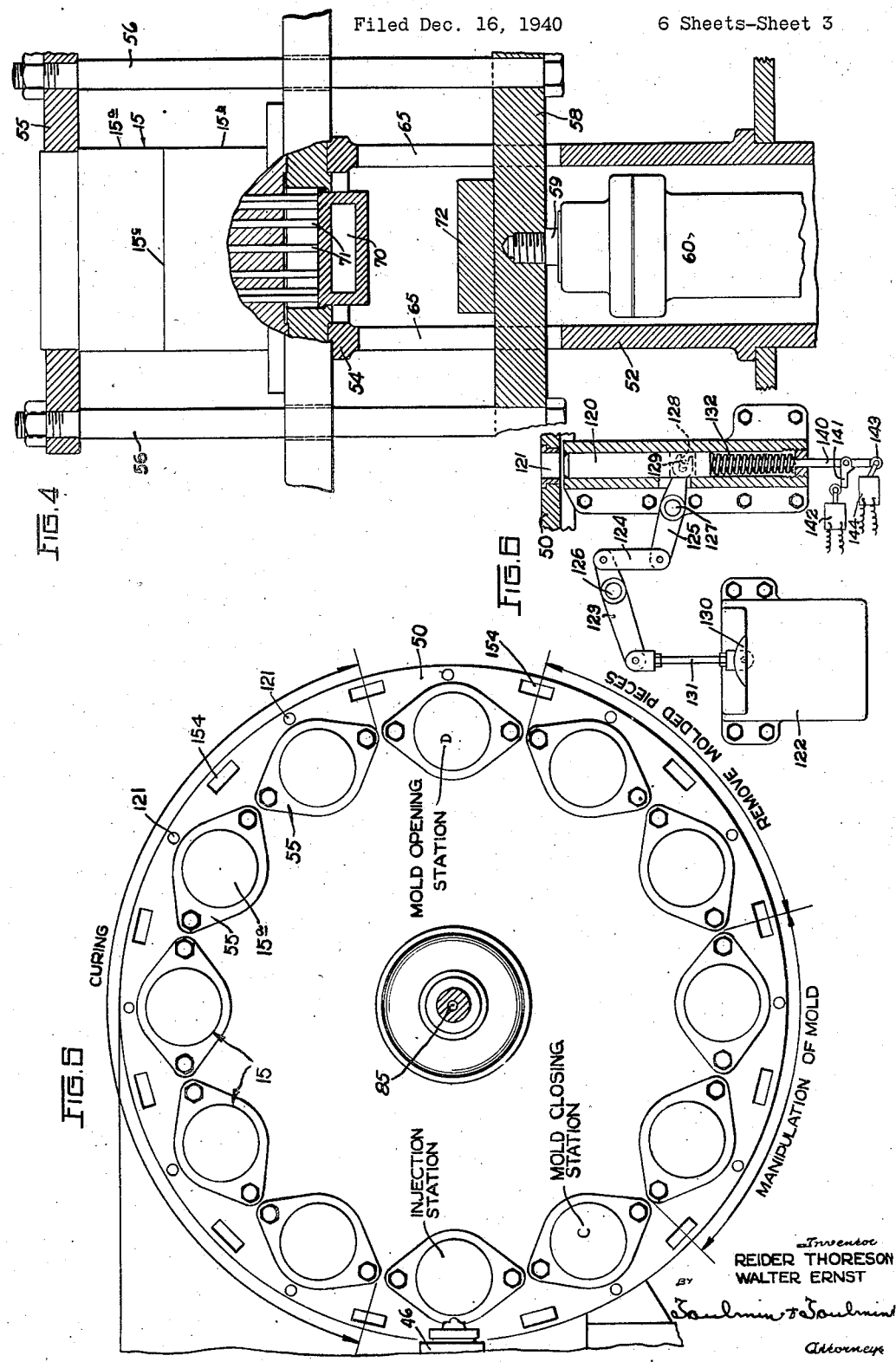

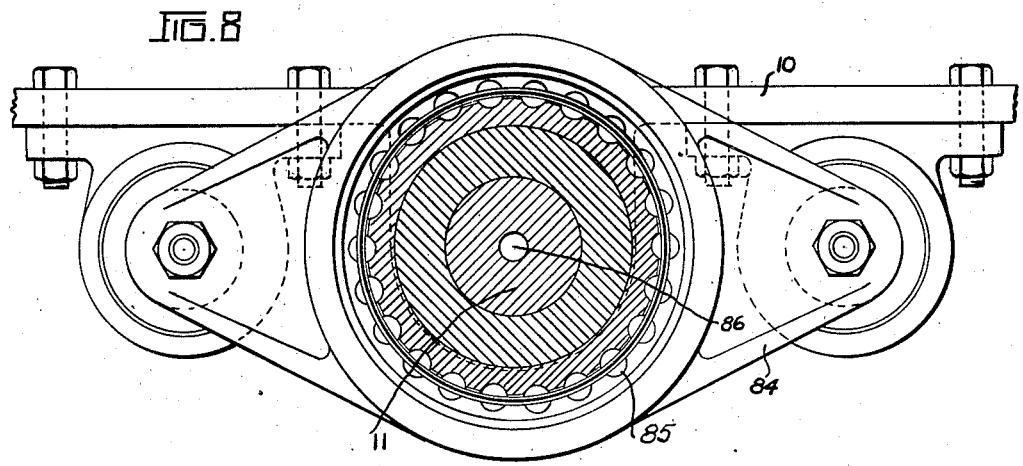
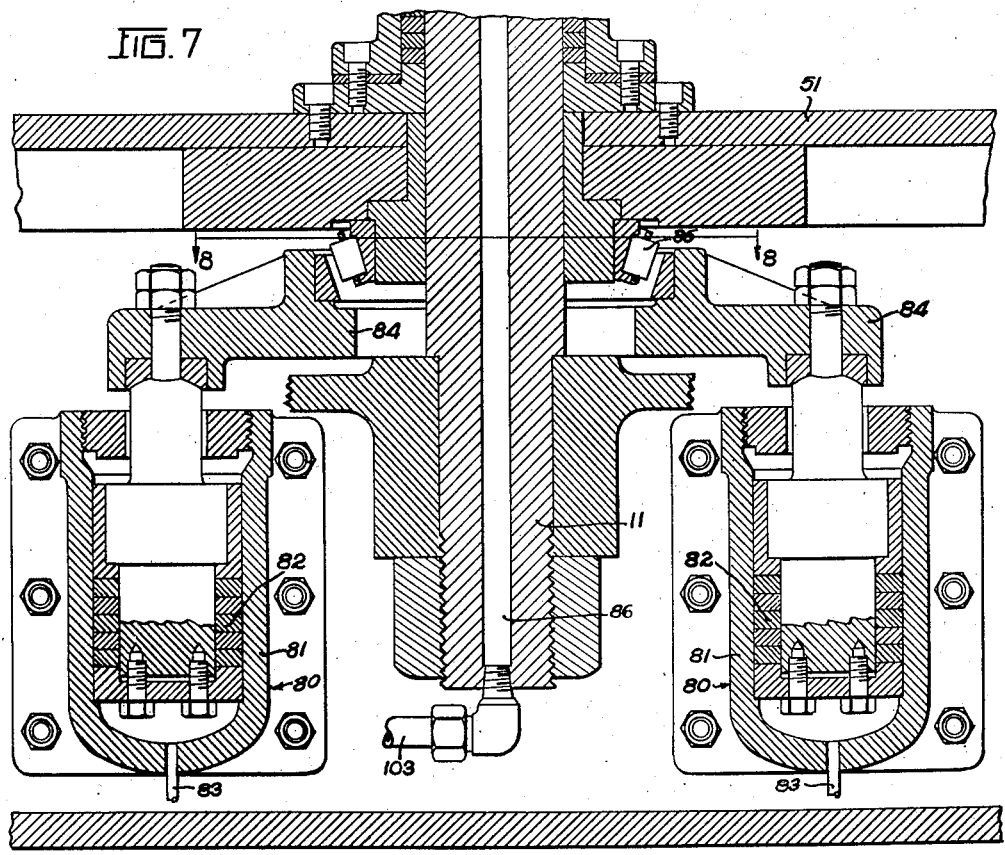

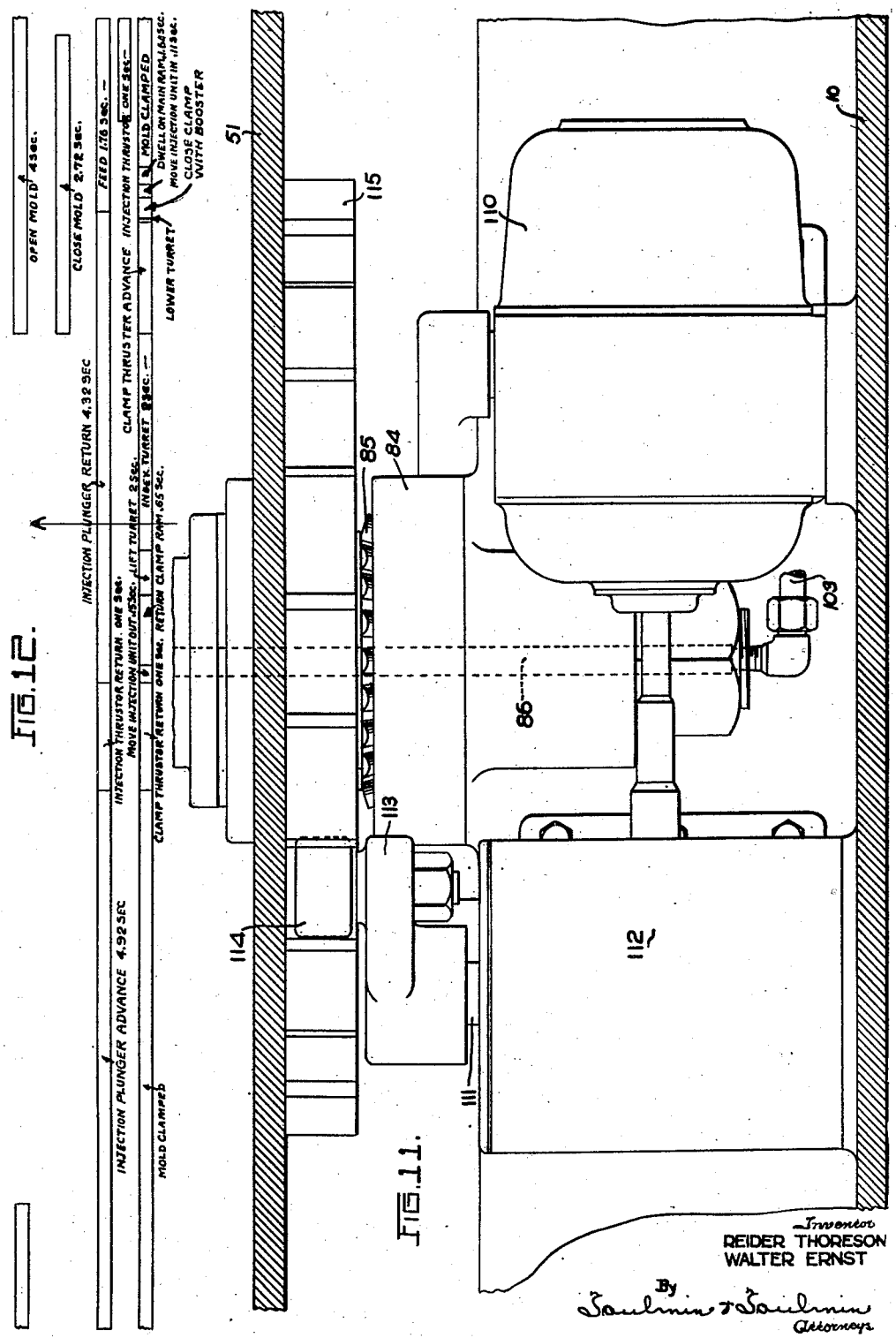

Patented Oct. 26, 1943

2,333,056

UNITED STATES PATENT OFFICE 2,333,056

TURRET TYPE INJECTION PRESS

Reider Thoreson, Detroit, Mich., and Walter Ernst, Mount Gilead, Ohio, assignors to The Hydraulic Development Corp., Inc., Wilmington, Del., a corporation of Delaware Application December 16, 1940, Serial No. 370,318

35 Claims. (Cl. 18—30)

This invention relates to machines for injection molding articles from plastic materials, the machine being of a turret type for sequential operation and which is completely automatic in its function.

It is an object of this invention to provide an improved arrangement of a turret type injection press, and simplified controls for establishing complete automatic operation thereof.

It is another object of the invention to provide a turret type injection press having a more compact and unified arrangement of the operating mechanisms thereof.

It is another object of the invention to provide a hydraulic control system for an injection press of the aforementioned type wherein the ratio of the resistance to movement of the various operating mechanisms to the pressure of the hydraulic fluid determines the sequence of operation of the hydraulically actuated elements.

It is another object of the invention to provide a turret type injection press wherein a hydraulic system is provided for closing the molds of the press prior to the time the molds are clamped by means of the main ram, the mold closing mechanism functioning independently of the mechanism for operating the main ram.

It is another object of the invention to provide a control system for a turret type injection press wherein the sequence of operations of the movements of the turret and press are controlled in a definite sequence and over definite time intervals.

It is another object of the invention to provide a completely automatic turret type plastic injection press.

It is still a further object of the invention to provide a completely automatic plastic injection machine wherein a plurality of molds are advanced adjacent the injection unit of the machine, and which advancement initiates an injection cycle.

It is another object of the invention to provide an automatic turret type injection press for injection molding thermoplastic resins.

It is another object of the invention to provide a plastic injection machine for injection molding thermosetting resins wherein the cycle of operation of the machine is completely automatic to provide a continuous molding cycle.

It is another object of the invention to provide a machine for molding thermosetting resins wherein an automatic cycle of operation is sufficiently rapid to permit substantially continuous ejection of material from the injection unit.

It is another object of the invention to provide an improved turret type plastic injection machine which has a rapid cycle of automatic operation and which permits the cycle of injection to be accomplished sufficiently rapid to prevent setting of thermosetting resins in the injection unit of the machine.

Further objects and advantages will be apparent from the following description and the drawings.

In the drawings:

Figure 1 is a diagrammatic system view disclosing the various operating elements of a turret type injection press, and the hydraulic and electrical controls for the same.

Figure 2 is a vertical cross-sectional view of the turret type injection press, the injection feeding unit being shown in elevation.

Figure 3 is a partial cross-sectional view of the upper portion of the main ram and booster therefor.

Figure 4 is a vertical cross-sectional view taken substantially along line 4—4 of Figure 2.

Figure 5 is a top view of the turret for the press taken along line 5—5 of Figure 2.

Figure 6 is an enlarged somewhat structural arrangement of the turret holding mechanism.

Figure 7 is a vertical cross-sectional view taken along line 7—7 of Figure 2.

Figure 8 is a horizontal cross-sectional view taken along line 8—8 of Figure 7.

Figure 9 is a top plan view of the Geneva movement for operating the turret, the view being taken substantially along line 9—9 of Figure 2.

Figure 10 is a partial end elevational view of the injection and feeding mechanism, looking in the direction of the arrow 10 of Figure 2.

Figure 11 is an end elevational view of the Geneva movement shown in Figure 9 looking in the direction of the arrow 11.

Figure 12 is a chart showing the various steps of operation of the press as they occur sequentially and simultaneously.

Referring now to the drawings, and particularly to Figure 1, the injection press of this invention consists of a frame or bed 10, which is constructed and arranged to form a fluid storage tank 10a, upon which there is mounted a plurality of strain rods 11. These strain rods 11 extend vertically from the bed 10 and support a fluid tank 12, which is in communication with the fluid storage tank 10a by means of the conduit 12a. The main ram 13 is suitably mounted within the tank 12 and is capable of vertical operation with respect the bed 10. The turret 14 is pivotally mounted upon one of the strain rods 11 and is adapted to be rotated thereupon by a suitable Geneva movement whereby a plurality of molds 15 are brought beneath the ram 13 during certain cycles of operation of the machine. The bed 10 of the press also supports an injection and feeding unit 16, which unit is capable of ejecting plastic materials therefrom into the molds 15.

The bed 10 of the press carries the strain rods 11 in a vertical position, which rods are secured to the bed 10 by means of the bolts 20. The upper ends of the strain rods 11 extend into suitable bosses 21 provided in the tank 12, and are secured thereto by means of the bolts 22. A casting 23 is provided internally of the tank 12 and extends upwardly from the bottom 24 thereof. The casting 23 is bored out to provide a cylinder 25 in which the ram 26 is arranged to reciprocate.

The ram 26 has a reduced diameter at one end thereof whereby a push back chamber 28 is provided between the ram 26 and the cylinder wall 25. The space provided between the ram and the cylinder wall, caused by the reduced portion of the ram 26 is sealed by means of a suitable packing gland 29. The upper end of the ram 26 cooperates with the wall of the cylinder 25 to effect sealing engagement therebetween, whereby the upper end of the ram provides a piston which can be reciprocated within the cylinder 25 when fluid is admitted to one side or the other thereof.

A booster piston 30 is provided centrally within the ram 26 and cooperates with a cylinder bore 31. The booster piston 30 is retained in threaded engagement with the upper end of the casting 23, as indicated at 32. A reduced diameter portion of the booster piston 30 extends through a suitable packing gland 33 provided therearound and in sealing engagement with a retaining fitting 34. The reduced diameter portion 35 is provided with a square head 36 which can be engaged by a suitable wrench for rotating the booster piston with respect the support casting 23 so as to position the inward end of the booster piston in proper relation with respect to the by-pass passages 35a provided in the main ram.

The ram booster piston 300 consists of a sleeve 301 which is dimensioned so as to provide a close sliding fit with the cylinder bore 31. The sleeve 301 telescopes over the end of the piston 300 and is retained thereon by means of the nut 302. To seal the space between the sleeve 301 and the piston 300 a plurality of piston rings 303 are positioned therebetween. This arrangement permits a simplified manufacture of the booster piston since the sleeve 301 can be manufactured to close tolerances, and alignment of the sleeve with the cylinder wall 31 can be more easily maintained since the piston rings 303 permit the piston to float within the sleeve 301.

A fluid inlet 36a is provided to a chamber 37 provided around the reduced diameter portion 35 of the booster piston 30. The booster piston 30 is bored out, as at 38, thereby providing a passage between the chamber 37 and the cylinder 31, whereby fluid is admitted to the cylinder 31 from a suitable source of pressure. When hydraulic fluid is admitted into the booster cylinder 31 the ram 26 is moved downwardly at a relatively rapid rate, the area above the ram 26 being filled through a check valve 40 from the fluid within the tank 12. When the booster 30 has caused the ram 26 to move downwardly a sufficient distance that the by-pass passages 35a are adjacent the end of the booster cylinder, the high pressure fluid from the pressure line 36a will be admitted to the area above the ram 26 through the passages 35a.

The arrangement just described with regard the ram of the injection press provides a rapid traverse of the ram 26 for a closing or pressing operation upon the molds 15, after which high pressure is applied thereupon by means of fluid passing through the passages 35a. The check or surge valve 40 permits the upper end of the ram cylinder to fill with fluid by suction of the ram 26 when it moves downwardly so that when the passages 35 arrive adjacent the end of the booster piston, pressure from the hydraulic line 36a can be immediately applied upon the large area of the ram.

The injection feeding unit for the machine may be of any of the more or less conventional types of mechanism wherein a hopper 45 contains the plastic material to be fed to the injection cylinder 46. A suitable electric motor 47 rotates a feeding mechanism within the throat of the hopper 45, whereby a predetermined quantity of material is fed into the injection cylinder 46 upon each return stroke of the injection plunger 48 as governed by a limit switch 49 which controls a suitable timing mechanism for determining the period of operation of the electric motor 47, all of which controls are well-known in the plastic injection machine art.

The injection plunger 48 is operated by means of a hydraulic motor 42 which is timed in its operation by means of controls to be hereinafter described.

The turret 14 consists of an upper and lower circular supporting plate 50 and 51 respectively, which are interconnected by means of a plurality of supporting columns 52. The supporting columns 52 extend downwardly below the lower supporting plate 51 and are adapted to engage a boss 53 provided upon the bed 10. As disclosed in Figure 2, the boss 53 is in alignment with the ram 13 so that when pressure is applied upon the mold 15 to close the same thrust of the pressure will be absorbed by the bed 10 through the column 52. There may be other bosses 53 positioned around the turret 14 upon which the columns 52 can be supported. However, the additional bosses are not essential to the operation of the machine.

The upper supporting plate 50 is arranged to carry a plurality of the molds 15 which are arranged in a ring adjacent the edge of the circular plate 50. The columns 52 are suitably secured to the supporting plate 50, as indicated at 54.

The molds 15 are arranged in two sections having an upper section 15a and a lower section 15b whereby the mold sections are adapted to be parted upon the parting line 15c. The lower section 15b of the mold 15 is secured to the turret 14, either as a permanent part thereof or can be arranged to be removably positioned upon the turret. The upper section 15a of the mold 15 is movable vertically with respect the lower section 15b and is carried by means of a plate 55 secured thereto, which in turn is supported by means of the vertically extending rods 56. The lower ends of these rods 56 are carried upon a plate 58 which in turn is supported upon the plunger 59 of a hydraulically actuated motor 60. The supporting column 52 is provided with slots 65 upon opposite sides thereof through which the plate 58 extends, and which permits reciprocation of the plate with respect the column 52, whereby the upper section 15a of the mold 15 can be moved with respect the lower section 15b when the plunger 59 of the hydraulic motor 60 is caused to function as will be hereinafter described.

The lower section 15b of the mold 15 is provided with a knock out pad 70 which carries a plurality of knock out pins 71. These pins extend through the mold section 15b with the ends thereof flush with the surface of the mold cavity. The plate 58 carries a block 72 which is adapted to engage the knock out pad 70 upon upward movement thereof caused by the plunger 59, whereby a molded article will be ejected from the mold 15 when the mold sections 15a and 15b are separated.

The hydraulic motor 60 consists of a cylinder 75 within which a piston 76 is adapted to reciprocate, the cylinder 75 having a suitable fluid inlet for admitting fluid below the lower surface of the piston 76, as indicated on the diagrammatic view of Figure 1. The hydraulic motor 60 is supported within the column 52 whereby the motor 60 moves with the turret 14.

Each station upon the turret consists of a mold 15, its cooperating supporting column 52 and a hydraulic motor 60, whereby each mold 15 can be opened or closed at any position around the circumferential travel of the turret 14, as controlled by suitable control mechanism to be hereinafter described.

The turret 14 is rotatably positioned upon one of the strain rods 11 and when in a stationary position is adapted to rest upon the boss 53, one or more of which can be positioned upon the base 10 adjacent the resting positions of the columns 52. A pair of hydraulic motors 80 is provided for raising the turret vertically during certain cycles of operation. The motors 80 consist of a cylinder 81 and a piston 82 (see Figure 7). A fluid inlet 83 is provided in the lower end of the cylinders 81 whereby admission of fluid into the cylinders 81 will cause the pistons 82 to rise, thereby carrying a cross head 84 into engagement with a roller bearing 85a. The roller bearing 85a provides means for eliminating friction between the supporting cross head 84 and the turret 14 when it is indexed by means of a Geneva movement to be hereinafter described. As long as the turret is being indexed by means of the Geneva movement it will be maintained in the raised position by the hydraulic motor 80.

Since the turret 14 is rotatable, and thus carries the hydraulic motors 60, means must be provided for carrying hydraulic fluid to and from the various hydraulic motors 60. To provide for this admission of fluid the strain rod 11, upon which the turret 14 is rotationally mounted, is provided with an upper passage 85 and a lower passage 86. The lower passage 86 communicates with the fluid storage tank 10a, while the upper passage 85 is connected to a suitable variable delivery fluid pump 79. An annular ring or chamber 87 encircles the strain rod 11 adjacent a pair of cross passages 88 and 89 which communicate with the passages 85 and 86 respectively. The chamber 87 is provided with a packing gland 90 at both ends thereof, and with a dividing packing gland 91, which separates the internal area of the chamber 87 into a pair of annular spaces 92 and 93. The annular space 92 is in communication with the fluid inlet passage 85 within the strain rod 11 while the annular passage 93 is in communication with the fluid return passage 86 which communicates with the fluid storage tank 10a. A fluid control valve 95 (see Figure 1) is provided having a fluid inlet connection 96 communicating with the annular space 92 and a fluid discharge connection 97 communicating with the annular passage 93. A pair of fluid conduits 98 and 99 interconnect the valve 95 with opposite ends of the hydraulic motor 60, the position of the valve mechanism determining the direction of flow of fluid to and from the opposite ends of the cylinder 75 of the hydraulic motor 60. The fluid pump 87 has a discharge side thereof connected by means of the conduit 100 to the fluid passage 85 in the strain rod 11. While the suction side thereof communicates with a fluid storage tank 101 by means of the conduit 102, the fluid return passage 86 in the strain rod 11 communicates with the fluid tank 101 by means of the conduit 103.

It is thus seen that a complete hydraulic circuit is provided for operating the hydraulic motor 60 in accordance with the position of the mechanism of the valve 95, the valve mechanism being shifted automatically by means of a cam ring 105 which is carried by the turret 14 to permit the same to reciprocate therewith but which is retained against rotation. A plunger 106 extends from the valve 95 and engages the surface of the cam ring to cause operation of the valve when in certain positions around the cam face. The plunger 106 extends from the valve 95 and operates the mechanisms therein to shift the valve to determine the direction of flow of fluid from the ends of the cylinder 75 of the hydraulic motor 60. Each of the molds 15, provided at the various stations upon the turret 14, are thus controlled by independently operated hydraulic motors for opening and closing the mold 15 in accordance with the position of the mold in its circumferential travel with the turret 14. The cam ring 105 is of course provided with suitable projections which engage the plunger 106 of the valve 95 to cause the plunger to shift the valve when positioned adjacent the projection on the cam ring 105.

As indicated upon Figure 5, the hydraulic motor 60 is adapted to operate to close a mold 15 when in the position indicated as "mold closing station." The mold, which is at the position indicated as "mold opening station," will be opened by means of a hydraulic motor 60, the opening and closing of the molds being controlled by the valve 95 and the particular shape of the cam ring 105. It is of course understood that the cam ring 105 can be so shaped as to control the opening and closing of the molds 15 by the hydraulic motors 60 when at any one of the positions of the stations provided on the turret 14.

As previously indicated, the turret is adapted to be indexed by means of a Geneva movement at periodic intervals in accordance with a prearranged timing circuit. The Geneva movement of the indexing mechanism consists of an electric motor 110 which drives a power output shaft 111 through means of a gear box 112. The power shaft 111 is provided with a crank arm 113 secured thereto upon which a roller 114 is suitably mounted. The Geneva wheel 115 is arranged with a plurality of slots 116 in the edge surface thereof, which slots are adapted to be engaged by the roller 114 when rotated by the crank arm 113, whereby the Geneva wheel is indexed a predetermined number of degrees. The Geneva wheel 115 is of course suitably secured to the turret 14, and particularly to the bottom supporting plate 51 so that when the wheel 115 is indexed, the turret 14 will be carried thereby to move the next successive mold 15 into alignment with the ram 26.

A locking pin 120 is reciprocably mounted adjacent the turret 14 and is adapted to engage an opening 121 provided in the turret wall 50. An opening 121 is provided adjacent each of the stations having a mold thereon, as indicated in Figure 5, whereby engagement of the locking pin 120 with the opening 121 will secure the turret 14 in a particular indexed position.

The locking pin 120 is controlled in its movement by means of an electrical solenoid 122 through a series of levers 123, 124 and 125, the lever 123 being pivotally mounted at 126, while the lever 125 is pivotally mounted at 127. The end of the lever 125 is provided with a fork 128 which engages a pin 129 mounted upon the locking pin 120. The lever 123 is connected with the armature 130 of the solenoid 122 by means of the rod 131. A helical spring 132 is positioned below the locking pin 120 and urges the same toward the opening 121 in the turret 14. This arrangement provides mechanism whereby the locking pin 120 will be normally urged into position within the openings 121 in the turret 14 to lock the same in stationary position during certain cycles of operation of the machine which will be more fully described.

The locking pin 120 is provided with a plunger extension 140 which has a pivotally mounted arm 141 extending therefrom, the arm 141 being mounted in a manner whereby it is rigid against movement upon an upward stroke of the plunger 140 but can be pivoted about its pivot pin upon a downward stroke of the plunger 140. This arrangement provides means for operating the electric switch 142 in only one direction of movement of the plunger 140. The plunger 140 is also adapted to engage the operating arm 143 of an electric switch 144 upon downward movement thereof, and retain the arm 143 in a position whereby the switch 144 provides a closed electric circuit until the locking pin 120 is driven into the opening 121 of the turret 14 by means of the spring 132. The electric switch 144 controls a relay 150 which in turn controls the electric motor 110 for starting and stopping operation of the Geneva movement.

The solenoid 122 is energized by means of an electric switch 152 which has an arm 153 extending into engagement with the surface of the turret 14 so that upward movement of the turret 14 will cause the arm 153 to swing into the position indicated in Figure 1, whereby the switch 152 is closed to make circuit to the solenoid 122. The switch 152 will remain closed until the turret 14 has indexed to a position wherein the slot 154 is adjacent the arm 153. The arm 153 may then fall into the slot 154 to permit breaking of the circuit in the switch 152 and be pivotally swung to the opposite side from that position indicated in Figure 1, whereby the switch 152 will remain open until the turret 14 has been lowered by means of the hydraulic motor 80. A plurality of the slots 154 is provided in the turret 14 in proper operative position with regard the molds 15.

The hydraulic circuit for controlling movement of the ram 26, advancement and retraction of the injection unit 16, and elevating and lowering of the turret 14 is controlled by means of a relay 160 operated by means of a solenoid 161. The relay 160 controls energization of a thruster 165 which in turn controls shifting of a four-way valve 166 positioned in the hydraulic circuit between the fluid pressure pump 167 and the aforementioned mechanisms. The pump 167 is a maximum constant pressure type variable delivery pump well known in the art and used commonly with plastic injection machines. The inlet 168 of the pump 167 communicates with the fluid reservoir 10a, while the discharge therefrom communicates with the inlet side of the four-way valve 166 by means of the conduit 169. A return line 171 is provided from the valve 166 to the suction side of the pump 167, either by way of communication with the fluid inlet 168 or by communication with the fluid reservoir 10a. The fluid line 170 connects one side of the valve 166 to the fluid line 36 communicating with the booster 30 of the ram 13. The line 170 also communicates with one side of a hydraulic motor 175. The motor 175 consists of a cylinder 176 and a stationary piston 177, the cylinder 176 being suitably secured to the injection feeding unit 16 so that entry of fluid in the chambers provided at the ends of the cylinder by the piston division wall therein will control advancement and retraction of the injection unit 16 with respect the mold 15 to bring the nozzle 178 of the injection cylinder 46 into or out of engagement with the mold 15. A fluid conduit 180 is also connected to the valve 166. This conduit communicates with the push back chamber of the ram 13 by means of the conduit 181, the conduit 180 also communicates with the hydraulic motor 80 for elevating the turret 14. A conduit 182 connects the push back chamber 28 of the ram 13 with the opposite end of the hydraulic motor 175 with respect the conduit 170.

This fluid circuit arrangement provides means whereby when the thruster 165 shifts the valve 166 to one position, fluid under pressure is circulated through the discharge conduit 169 through the valve 166, as determined by the ports therein, and into the conduit 180 whereby fluid under pressure is transmitted to the push back chamber 28 of the ram 13, the hydraulic motor 80 for the turret 14, and to the chamber 185 of the hydraulic motor 175.

The total force required to retract the unit 16, to lift the ram 26 and to raise the turret 14 has been predetermined and so ratioed that the injection unit 16 will be the first element moved by the pressure, thus insuring removal of the nozzle 178 from the mold 15 in advance of movement of either the ram 26 or the turret 14. The total resistances of the ram 26 and of the turret 13 will determine which of these two elements will move first, preferably the ram being elevated prior to the time the turret is raised.

During this period of retraction of the injection unit, elevation of the ram and the raising of the turret, the return circuit for the fluid for the hydraulic motor 175 and the ram 13 has been through the conduit 170. To permit the upper chamber 186 of the ram to clear of fluid during the push back operation, a relief valve 187 is provided in a by-pass line 188, the valve being controlled by fluid pressure in the conduit 182 through means of the intercommunicating conduit 188a.

When the thruster 165 is de-energized by the relay 160 the valve 166 is shifted to its opposite position whereby fluid under pressure is then circulated through the conduit 170, and the conduits 180 and 182 become the return conduits for the fluid from the various hydraulic motors connected thereby. Since the turret 14 was the last element to be moved by the pressure developed in the previously described hydraulic system, it will be seen that the weight of the turret will thus cause it to be the first element to be returned to operating position upon a slight release of pressure in the hydraulic system. The ram 26 will then move downwardly through operation of the booster 30, the resistance of the ram to downward motion being less than the resistance to movement of the injection unit. The injection unit 16 will thus be the last element to be moved into operating position. Since the operation of the booster 30 of the ram 26 is such that practically no fluid pressure is developed in the conduit 170 until the ram contacts the mold 15 it can be seen that considerable time is given the turret 14 to drop into position before the injection unit 16 is advanced by the fluid pressure in the conduit 170.

An electrical timing mechanism is provided for starting the cycling of various mechanisms, certain of the mechanisms being dependent upon operation of other of the mechanisms started by the cycle control. The cycle control consists of an electric motor 200 having a shaft 201 extending therefrom upon which there are mounted three cams 202, 203 and 204. The cam 202 controls operation of a pair of electric contacts 205 which in turn control the energization of a solenoid 206 for operating a relay 207. The cam 203 controls the operation of a pair of contacts 210, while the cam 204 controls the operation of a pair of contacts 211.

The electric motor 200 for the cycle control is initially energized by means of a pair of contacts 212 which are momentarily closed by means of a pressure switch 215, the pivoted latch 216 providing means to close the contacts 212 upon an upward stroke of the latch 216, but it will not effect operation of the contacts 212 upon a downward stroke thereof. The pressure switch 215 is controlled by the pressure existing in the conduit 170 and is thus responsive to fluid pressure from the hydraulic motor 167 when the injection unit 16 and the ram 13 are advanced into engagement with the mold 15. The switch 215 thus starts operation of the cycle control for initiating an injection cycle, to be subsequently described.

The hydraulic system for controlling movement of the injection plunger 48 is controlled by the relay 207. The relay 207 controls energization of a thruster 220 which in turn controls the positioning of the valve mechanism of the four-way valve 221. A variable delivery pump 222, capable of delivering a predetermined maximum pressure, provides the pressure source for operation of the hydraulic motor 42 which in turn moves the injection plunger 48. The hydraulic pump 222 is provided with an inlet 223 communicating with a fluid storage tank 224, and has an outlet 225 communicating with the four-way valve 221. The valve 221 has a return conduit 226 for conducting fluid from the valve to the fluid storage tank 224. A pair of conduits 227 and 228 connect ports in the valve 221 with opposite ends of the cylinder 229 of the hydraulic motor 42, whereby the piston 230 is caused to reciprocate within the cylinder 229 depending upon which of the conduits 227 or 228 are connected with the pressure discharge of the pump 222 by means of the valve 221.

The molds 15 are arranged to be heated electrically, suitable electric heating elements being positioned within the body of the mold halves 15a and 15b for elevating the temperature thereof. Since the molds 15 revolve with the turret 14, a slip-ring arrangement is provided for carrying current to the molds 15. This arrangement consists of a plurality of electrical conducting rings 330 stationarily mounted upon the strain rod 11 which supports the turret 14, and suitably electrically insulated therefrom, and from each other. A plurality of posts 331 are vertically positioned upon an insert 332 provided in the supporting plate 50 of the turret 14. A post 331 is provided for each of the molds stationed upon the turret. A plurality of brush holders 333 is provided upon each of the posts 331 and are arranged to be electrically connected to the heating elements positioned within the mold halves 15a and 15b of each of the molds. Each of the brush holders 333 has a brush mounted therein adapted to engage a ring 330 whereby the current will be conducted from the power source to the resistance units in the molds.

The operation of the machine is as follows: Assuming the position of the apparatus to be as indicated in Figure 1 wherein the timer motor 200 has just stopped due to the opening of the contacts 211. The contacts 210 have just been momentarily opened by means of the recess 250 provided in the face of the cam 203 and has again been closed. The momentary opening of the contacts 210 de-energized the solenoid 161 whereby its holding circuit through the conductor 251, the contacts 252, the conductor 253, the contacts 210, the conductor 254, the solenoid 161 to the power source was broken. Also, the circuit to the thruster 165 through the relay 160 was broken, whereby the thruster shifted the valve 166 to a position to introduce fluid under pressure into the fluid conduits 180 and 182. The fluid pressure has retracted the injection and feeding unit 16, has lifted the ram 13, and has raised the turret 14. At the time the contacts 210 were broken contacts 205 were also broken so that the thruster 220 has moved to a position to cause retraction of the injection plunger 48 within the injection cylinder 46. The mold 15 is still closed, being retained in that position by means of the hydraulic motor 60, the four-way valve 95 having been shifted to the proper position for causing closure of the mold.

With these assumptions in mind the cycle of operation is as follows, reference being made in the subsequent description to Figures 1 and 12. The position of the elements as disclosed in Figure 1, and with the assumptions heretofore made, are such that the cycle of operation begins substantially at the line indicated A on Figure 12.

The turret 14 has been raised by the hydraulic motor 80 whereby the arm 153 of the electric switch 152 has moved upwardly to close circuit through the solenoid 122. Energization of the solenoid 122 causes removement of the locking pin 120 from the locking opening 121 in the turret 14. The downward movement of the locking pin 120 and its associated plunger 131 causes the end of the plunger to engage the operating arm of the switch 144, whereby circuit is made through the conductor 260, the relay 150 and the conductor 262, whereby the relay 150 is closed to energize the motor 110. The motor 110 will thus drive the Geneva movement comprising the crank arm 113 and the Geneva wheel 115 to start indexing the turret 14.

Shortly after the turret begins indexing the arm 153 of the switch 152 drops into a recess 154 in the turret 14 whereby circuit is broken through the switch 152, thereby deenergizing the solenoid 122. The de-energization of the solenoid 122 permits the spring 132 to move the locking pin 120 into engagement with the under side of the supporting plate 50 of the turret 14 so that the pin 120 will be ready to engage the next successive locking opening 121. The switch 152 cannot again make circuit until the turret 14 is lowered, since the arm 153 thereof will be swung to the left-hand position by the recesses 154 when the turret is indexing.

Upon the turret reaching its next successive position, the molds 15 arriving at the stations indicated at C and D of Figure 5 will be closed and opened respectively, a valve 95 for the mold reaching the station C being shifted by the cam ring 105 to cause operation of the hydraulic circuit associated therewith in a manner to close the mold 15 by means of a hydraulic motor 60, while the mold 15 reaching the station D will be opened by means of a hydraulic motor 60 since the valve 95 associated therewith will be shifted to a position by means of the cam ring 105 to allow such operation. Once the valve has initiated this operation, movement of the mold halves 15a will occur until completion thereof at which time the variable delivery pump wil reach a maximum pressure and shift to neutral by means of a control well-known in the art.

At the same instant the locking pin 120 moves into the locking opening 121, whereby the pivoted lever 141 engages the operating arm of the switch 142 to momentarily close the same whereby circuit is made through the conductor 265, the switch 142, the conductor 266, the solenoid 161 to the power source for momentary energization of the solenoid 161.

Energization of the solenoid 161 closes the relay 160 whereby circuit is made to the thruster 165 and a circuit is made through the conductor 251, the contacts 252, the conductor 253, the contacts 210, the conductor 254, the solenoid 161 to the power source whereby a holding circuit for the solenoid 161 is provided.

The thruster 165 will then shift the valve 166 to cause fluid under pressure to be discharged through the conduit 170, the conduits 180, 181 and 182 becoming fluid return conduits for fluid returning to the fluid reservoir 10a, whereby the turret 14 is permitted to drop until the supporting column 52 strikes the supporting boss 53. The discharge of fluid under pressure through the conduit 170 causes the booster 30 of the ram 13 to move the same downwardly. However, the pressure will not build up in the line 170 until the ram 13 has contacted the mold 15 which has been moved thereunder. When the ram 13 contacts the mold 15 sufficient pressure will be built up in the conduit 170 and the chamber 270 to cause the injection feeding unit 16 to advance toward the mold 15 and engage the nozzle 178 thereof with the mold 15. Pressure will then build up in the ram 13 for clamping the mold together for injection of plastic material. When the pressure in the conduit 170 increases to a sufficient extent the pressure switch 215 will expand and cause the pivoted lever 216 to close the contacts 212 as it approaches and moves past the operating arm for the contacts 212. The momentary closure of the contacts 212 energizes the cycle control motor 200 whereby the cams 202, 203 and 204 are started upon a rotation cycle.

When the cams 202, 203 and 204 begin rotation, contacts 211 are immediately closed whereby a circuit is established through the conductor 272, the conductor 273, the contacts 211, the conductor 274, the motor 200 and the conductor 275 to the power source, thereby providing a holding circuit for the cycle control motor 200 during a complete revolution of the cams driven thereby. Shortly after the holding circuit is made, the contacts 205 are closed by the cam 202 whereby circuit is established to the solenoid 206 to close the relay 207, thereby energizing the thruster 220.

When the turret was lowered the injection plunger 48 had reached its complete return stroke from a former cycle, whereby the switch 49 is closed by a collar 277 secured to the injection plunger 48 engaging the switch lever to start the timing mechanism for controlling a feeding cycle. A predetermined quantity of plastic material is fed into the injection cylinder 46. This timing of the feed mechanism is such that the feeding will stop when the injection thruster 220 has shifted the valve 221 to a position which begins the injection cycle, suitable automatic mechanism, well known in the plastic injection art, being provided for the purpose.

The energization of the thruster 220 by the relay 207 shifted the valve 221 to establish fluid pressure to the rear end of the piston 230 of the hydraulic motor 42 whereby the injection plunger is started forward on an ejecting operation. The ejection plunger moves forward for an ejecting operation and remains in the forward position until the cam 202 has rotated to a position whereby the recessed portion 278 passes under the control arm for the contacts 205. At this instant the contacts 205 are broken and the solenoid 206 is de-energized to open the relay 207, whereby the thruster 220 shifts the valve 221 to establish pressure fluid within the conduit 228, thereby establishing a retraction stroke of the plunger 48. Substantially at the same time the contacts 210 have been opened by the control arm thereof reaching the recess 250 in the cam 203, the holding circuit to the solenoid 161 is broken by momentary opening of the contacts 210 thereby breaking circuit through the relay 160. Breaking of the circuit through the relay 160 de-energizes the thruster 165, thereby shifting the valve 166 to a position to establish pressure fluid in the conduits 180, 181 and 182. Establishment of pressure in these conduits will cause the injection unit 16 to retract from the mold 15, the ram 13 to lift, and the turret to raise in the sequence just mentioned for the reasons heretofore discussed with regard ratio of weight and resistance of the various elements to the pressure established in the conduits.

The system is now in the same condition which started the cycle, except that the cycle control motor 200 is still functioning, and will function until the control arm for the contacts 211 break circuit therethrough by means of the control arm falling into a recess 280, whereby the holding circuit for the motor 200 is broken. This again establishes the cycle control in position for the beginning of the next cycle of operation.

The plastic injection machine herein described has not been specifically mentioned with regard either the use of thermoplatic or thermosetting resins. However, the machine can be used with either type of plastic material and is particularly adaptable for use with the thermosetting resins since the improved cycle of operation establishes a sufficiently rapid automatic cycle of operation by which the thermosetting plastic material can be ejected from the injection cylinder sufficiently often to prevent the setting thereof while within the cylinder. The mold 15 is electrically heated, as has heretofore been described, to provide means whereby the thermosetting resin can be heated sufficiently to set the same after the material has been injected into the mold. The molds 15 are continuously heated through their circuit around the turret so that the plastic material is injected into a hot mold and will be subsequently heated through the various indexed stations through which the molding is carried after leaving the molding station. It is of course to be understood that the machine is capable of injection molding either the thermoplastic or thermosetting resins depending upon whether the mold 15 is heated or is cooled. The thermoplastic resins can be injection molded upon this machine by merely disconnecting the heating circuit to the mold.

While the form and embodiment herein disclosed and described is a preferred form, yet other modifications are conceivable which are to be included within the scope of my invention.

Having thus fully described our invention, what we claim as new and desire to secure by Letters Patent is:

1. In a machine for injection molding plastic materials, a support, a turret movable on said support, a mold carried by said turret, means for elevating said turret from said support to permit rotation thereof, a ram, means for reciprocating said ram to apply pressure upon said mold when disposed beneath said ram, an injection unit, and means for moving said injection unit into and out of engagement with said mold, the effective operating force of the respective operating means for said injection unit, ram and turret being proportioned to the size, weight and frictional resistance of the respective members and with respect to one another to cause operation of the injection unit, ram and turret by their respective operating means in a prearranged sequence.

2. In a machine for injection molding plastic materials, a support, a turret movable on said support, a mold carried by said turret, hydraulic means for elevating said turret from said support for the same to permit rotation thereof, a ram, hydraulic means for reciprocating said ram to apply pressure upon said mold when disposed beneath said ram, an injection unit, and hydraulic means for moving said injection unit into and out of engagement with said mold, said hydraulic means for operating said injection unit, said ram and said turret being supplied with fluid simultaneously at a common pressure, said hydraulic operating means for said injection unit, said ram and said turret having their effective operating force proportioned to the size, weight and frictional resistance of the respective members and with respect to one another for establishing a prearranged sequence of operation.

3. In a machine for injection molding plastic materials, a support, a turret movable on said support, a mold carried by said turret, hydraulic means for elevating said turret from said support for the same to permit rotation thereof, a ram, hydraulic means for reciprocating said ram to apply pressure upon said mold when disposed beneath said ram, an injection unit, and hydraulic means for moving said injection unit into and out of engagement with said mold, said hydraulic means for operating said injection unit, said ram and said turret being supplied with fluid simultaneously at a common pressure, said hydraulic operating means for said injection unit, said ram and said turret having their effective operating force proportioned to the size, weight and frictional resistance of the respective members and with respect to one another for establishing a prearranged sequence of operation, the forces for moving said three elements being arranged in a determined ratio to the common pressure in a manner that the injection unit is retracted from said mold before said turret is elevated.

4. In a machine for injection molding plastic materials, a support, a turret movable on said support, a mold carried by said turret, hydraulic means for elevating said turret from said support for the same to permit rotation thereof, a ram, hydraulic means for reciprocating said ram to apply pressure upon said mold when disposed beneath said ram, an injection unit, and hydraulic means for moving said injection unit into and out of engagement with said mold, said hydraulic means for operating said injection unit, said ram and said turret being supplied with fluid simultaneously at a common pressure, said hydraulic operating means for said injection unit, said ram and said turret having their effective operating force proportioned to the size, weight and frictional resistance of the respective members and with respect to one another for establishing a prearranged sequence of operation, the forces for moving said three elements being arranged in a determined ratio to the common pressure in a manner that said turret is lowered to its operating position before said injection unit engages said mold.

5. In a machine for injection molding plastic materials, a support, a turret movable on said support, a mold carried by said turret, a hydraulic motor for elevating and lowering said turret with respect to said support for the same to permit intermittent rotation thereof, a ram, a hydraulic motor for reciprocating said ram with respect to said mold to apply pressure upon said mold when disposed beneath said ram, an injection unit, and a hydraulic motor for moving said injection unit into and out of engagement with said mold, said motors being connected to a common source of fluid pressure constructed and arranged for increasing fluid pressure upon said motors, said injection unit, said hydraulic motors for said ram and said turret being constructed and arranged in a manner that the actuating force of the hydraulic motors for operating their respective means is proportioned one to the other to produce a determined sequence of operation of said units when fluid pressure is increased upon said motors.

6. In a machine for injection molding plastic materials, a support, a turret movable on said support, a mold carried by said turret, a hydraulic motor for elevating and lowering said turret with respect to said support for the same to permit intermittent rotation thereof, a ram, a hydraulic motor for reciprocating said ram with respect to said mold to apply pressure upon said mold when disposed beneath said ram, an injection unit, and a hydraulic motor for moving said injection unit into and out of engagement with said mold, said motors being connected to a common source of fluid pressure constructed and arranged for increasing fluid pressure upon said motors, said injection unit, said hydraulic motors for said ram and said turret being constructed and arranged in a manner that the actuating force of the hydraulic motors for operating their respective means is proportioned one to the other to produce a determined sequence of operation of said units when fluid pressure is increased upon said motors, said turret being constructed and arranged to offer greater resistance to movement for lifting thereof than the resistance offered by said injection unit for retraction thereof out of engagement with said mold but less resistance to movement for lowering thereof than the resistance of said injection unit for advancement thereof into engagement with said mold.

7. In a machine for injection molding plastic materials, a support, a turret movable on said support, a mold carried by said turret, a hydraulic motor for elevating and lowering said turret with respect to said support for the same to permit intermittent rotation thereof, a ram, a hydraulic motor for reciprocating said ram with respect to said mold to apply pressure upon said mold when disposed beneath said ram, an injection unit, and a hydraulic motor for moving said injection unit into and out of engagement with said mold, said motors being connected to a common source of fluid pressure constructed and arranged for increasing fluid pressure upon said motors, said injection unit, said hydraulic motors for said ram and said turret being constructed and arranged in a manner that the actuating force of the hydraulic motors for operating their respective means is proportioned one to the other to produce a determined sequence of operation of said units when fluid pressure is increased upon said motors, said turret being constructed and arranged to offer greater resistance to movement for lifting thereof than the resistance offered by said injection unit for retraction thereof out of engagement with said mold but less resistance to movement for lowering thereof than the resistance of said injection unit for advancement thereof into engagement with said mold, said ram being constructed and arranged to offer resistance intermediate that of said turret and said injection unit to cause operation thereof during an intervening interval.

8. In a machine for injection molding plastic materials, a turret, a plurality of molds comprising die halves supported on said turret, means attached to one of said die halves for reciprocating the same with respect to the other die half to open and close said mold provided thereby, an injection unit adjacent said turret providing a mold station, means for indexing said turret to bring successive molds into the mold station, means for actuating said reciprocating means for closing said die halves in advance of reaching the mold station, and means for applying clamping pressure upon said die halves when in the mold station.

9. In a machine for injection molding plastic materials, a turret, a plurality of molds comprising die halves supported on said turret, means attached to one of said die halves for reciprocating the same with respect to the other die half to open and close said mold provided thereby, an injection unit adjacent said turret providing a mold station, means for indexing said turret to bring successive molds into the mold station, means operated by indexing of the turret for actuating said reciprocating means for closing said die halves in advance of reaching the mold station, and means for applying clamping pressure upon said die halves when in the mold station.

10. A machine for molding plastic materials comprising, a frame, a turret rotatably mounted upon said frame and having a plurality of molds positioned thereon, means for applying clamping pressure upon said molds, means for indexing said turret to bring successive molds adjacent the clamping means, and a supporting column in alignment with said mold and said ram interposed between said turret and said frame to support said turret when clamping pressure is applied to said molds.

11. A machine for molding plastic materials comprising a frame, a turret rotatably mounted upon said frame and having a plurality of molds positioned thereon, means for applying clamping pressure upon said molds, means for indexing said turret to bring successive molds beneath the clamping means, and a supporting column carried by said turret in alignment with each mold adapted to support said turret when the respective molds are disposed beneath said clamping means and clamping pressure is applied to the mold by said clamping means.

12. A machine for molding plastic materials comprising a frame, a turret rotatably mounted upon said frame and having a plurality of molds positioned thereon, means for opening and closing said molds, means for applying clamping pressure upon said molds, means for indexing said turret to bring successive molds beneath the clamping means, and a supporting column interposed between said turret and said frame to support said turret when clamping pressure is applied to said molds, said mold opening and closing means being positioned within said column.

13. A machine for molding plastic materials comprising a frame, a turret rotatably mounted upon said frame and having a plurality of molds positioned thereon, individual means for opening and closing each of said molds, means for applying clamping pressure upon said molds, means for indexing said turret to bring successive molds beneath the clamping means, and supporting columns carried by said turret interposed between said turret and said frame to support said turret when the respective molds are disposed beneath said clamping means and clamping pressure is applied to said molds, one of said molds opening and closing means being positioned within each of said columns.

14. A machine for molding plastic materials comprising, a frame, a turret rotatably mounted upon said frame, a plurality of molds carried by said turret, a plastic injection feeding unit reciprocably carried upon said frame, means for advancing and retracting said unit with respect to said turret, means for elevating said turret to permit indexing thereof, means for indexing said turret, and means for supporting said turret when in the lowered position.

15. A machine for molding plastic materials comprising a frame, a turret, means extending from said frame providing a vertical axle for said turret, anti-friction means on said axle for supporting said turret, means for indexing said turret, hydraulic means engaging said anti-friction means to hold said turret in an elevated position while the same is being indexed, and a plurality of columns carried by said turret at least one of which supports said turret when in the lowered position.

16. A machine for molding plastic materials comprising a frame, a plurality of strain rods extending upwardly from said frame, a ram carried by said strain rods and disposed in parallel relation thereto, a turret, one of said strain rods forming an axle upon which said turret is rotatably mounted, a plastic injection feeding unit arranged in operative association with said turret, a plurality of molds on said turret, and means for indexing said turret to bring successive molds into operative relation with said injection unit and in alignment with said ram.

17. A plastic injection machine comprising a frame, a vertically acting ram supported above said frame, a turret rotatably mounted on said frame, a plurality of molds carried by said turret, a plurality of columns carried by said turret in axial alignment with said molds, hydraulically actuated means carried within said columns for opening and closing the mold which is in alignment with said column, a plastic injection feeding unit movable into engagement with said molds, and means for indexing said turret to bring successive molds adjacent said injection unit.

18. A machine for molding plastic materials comprising a supporting frame, a turret rotatably mounted upon said frame, a vertically acting ram for elevating said turret, a plurality of molds carried by said turret, a plastic injection unit in operative association with said turret, means for indexing said turret to bring successive molds adjacent said injection unit, means for holding said turret in an elevated position while the same is being indexed, and means actuated by the turret upon elevation thereof for initiating operation of the indexing means.

19. A machine for molding plastic materials comprising a supporting frame, a horizontally disposed turret rotatably mounted upon said frame, a vertically acting ram in operative association with said turret, a plurality of molds carried by said turret, a plastic injection unit in operative association with said turret, means for indexing said turret to bring successive molds adjacent said injection unit, means for locking said turret in an indexed position, and means actuated by said locking means for automatically starting and stopping said indexing means.

20. A machine for molding plastic materials comprising a supporting frame, a turret, an axle extending from said frame, said turret being positioned upon said axle for rotation and reciprocation thereon, a ram in operative association with said turret, a plurality of molds carried by said turret, a plastic injection unit in operative association with said turret, means for rotatably indexing said turret to bring successive molds adjacent said injection unit, means for elevating said turret from said frame, said elevating means holding said turret in elevated position during indexing thereof, and means actuated by said turret upon elevation thereof for initiating operation of the said indexing means, and means actuated by said turret upon completion of said indexing operation for initiating operation of an injection cycle of said plastic injection unit.

21. A turret type plastic injection machine comprising a frame, a turret, an axle extending from said frame, said turret being positioned upon said axle for rotation and reciprocation thereon, means for elevating said turret from said frame, means for rotatably indexing said turret, means for locking said turret in an indexed position, means actuated by said turret upon elevation thereof for unlocking said locking means, and means actuated by said locking means upon unlocking thereof for starting said indexing means and for stopping said indexing means when said locking means enters locking engagement with said turret.

22. A machine for molding plastic materials comprising a supporting frame, a turret, an axle extending from said frame, said turret being positioned upon said axle for rotation and reciprocation thereon, a ram in operative association with said turret, a plurality of molds carried by said turret, a plastic injection unit in operative association with said turret, means for rotatably indexing said turret to bring successive molds adjacent said injection unit, means for elevating said turret from said frame, said elevating means holding said turret in elevated position during indexing thereof, means for locking said turret in position with respect to said frame, an electric switch means actuated by said turret upon elevation thereof for unlocking said locking means, means actuated by said locking means for initiating operation of said indexing means upon an unlocking motion, and means actuated by said locking means for initiating an injection cycle of said injection unit upon a locking motion thereof.

23. A plastic injection machine comprising a turret, means for rotatably and reciprocably supporting said turret, a plurality of molds carried on said turret, a plastic injection unit in operative association with said turret, hydraulic means for advancing and retracting said injection unit with respect to said turret, timing mechanism for controlling operation of said injection unit, a hydraulically actuated ram for applying closing pressure upon said molds during an injection cycle of said injection unit, means for indexing said turret to bring successive molds adjacent said injection unit, hydraulic means for elevating said turret and for holding the same in elevated position while indexing the turret, means for locking said turret in indexed position, an electric switch means actuated by said turret upon elevation thereof for unlocking said locking means, means actuated by said locking means for initiating an indexing motion of said turret upon an unlocking motion, and means actuated by said locking means upon a locking motion for initiating operation of the hydraulic means for closing said ram, lowering said turret, advancing said injection unit and for initiating operation of said timing mechanism.

24. An electrical system for a plastic injection machine which includes a turret, an injection unit, and a plurality of molds carried by said turret for positioning adjacent the injection unit; comprising an electric switch means actuated by the turret upon elevation of the turret for initiating an indexing operation of the turret, electric switch means actuated upon completion of the indexing operation of the turret for initiating operation of the injection cycle of the machine, and an electrical timing mechanism initiated in operation by said last mentioned switch means for controlling the duration of the injection cycle.

25. In a hydraulically operated injection machine a turret, means for rotatably and reciprocably supporting said turret, means for indexing said turret, mechanism for locking said turret in indexed position, an injection unit adjacent said turret, a plurality of molds carried by said turret for positioning adjacent said injection unit and a mold clamp, an electrical control system; comprising switch means actuated by the turret upon elevation of the turret for operating the locking mechanism to unlock the same, electric switch means actuated by the locking mechanism during unlocking thereof for initiating operation of the indexing means, and electric switch means actuated by the locking mechanism during locking thereof for initiating operation of the hydraulic system which controls vertical movement of the turret, application of hydraulic pressure to the hold clamping device and advancement of the injection unit into engagement with the mold, and the initiation of a timing mechanism which controls the operation of the injection unit.

26. A turret type plastic injection machine including a turret, means for locking said turret, means for indexing said turret, a mold clamping ram, molds carried by said turret, a plastic injection unit, and hydraulic motors for operating said turret, said ram and said injection unit, said machine having a motivating system comprising a hydraulic system for applying pressure upon the mold clamping device of the machine and for advancing the injection unit into engagement with the mold, a second hydraulic system for operating the injection unit, a timing mechanism for controlling the operation of the second hydraulic system, electric switch means actuated by the turret locking mechanism for controlling operation of a second electric switch means, said second switch means controlling operation of the first mentioned hydraulic system and initiating operation of the timing mechanism.

27. A turret type plastic injection machine including a turret, means for locking said turret, means for indexing said turret, a mold clamping ram, molds carried by said turret, a plastic injection unit, hydraulic motors for operating said turret, said ram and said injection unit, said machine having a motivating system comprising a hydraulic system for applying pressure upon the mold clamping device of the machine and for advancing the injection unit into engagement with the mold, a second hydraulic system for operating the injection unit, a timing mechanism for controlling the operation of the second hydraulic system, electric switch means actuated by the turret locking mechanism for controlling operation of a second electric switch means, said second switch means controlling operation of the first mentioned hydraulic system and initiating operation of the timing mechanism, and means operated by pressure developed in the first mentioned hydraulic system for initiating operation of the last mentioned hydraulic system.

28. An injection machine comprising a turret, means rotatably and reciprocably supporting said turret, a plurality of molds positioned circumferentially upon said turret, means for opening and closing said molds, means for indexing said turret, means for elevating said turret while indexing the same, and means operated by said elevating and indexing motion of said turret for operating said mold opening and closing means for controlling the opening and closing of said molds.

29. An injection machine comprising a turret, means rotatably and reciprocably supporting said turret, a plurality of molds positioned circumferentially upon said turret, a hydraulic motor for opening and closing said molds, means for indexing said turret, means for elevating said turret, and valve means operated by said elevating and indexing motions of said turret for controlling operation of said hydraulic motor for opening and closing said molds.

30. An injection machine comprising a turret, means rotatably and reciprocably supporting said turret, a plurality of molds positioned circumferentially upon said turret, a hydraulic motor associated with each of said molds for opening and closing the same, a fluid flow control valve associated with each of said motors, a non-rotatable cam ring associated with said valves, said control valves having means engaging a cam ring to operate said valves, means for indexing said turret, and means for elevating said turret, said valve means operatively controlling fluid flow to said hydraulic motors when moved by the indexing motion of said turret with respect to said cam ring.

31. A hydraulic system for opening and closing the molds positioned upon the turret of a turret type plastic injection machine including a turret, a hydraulic motor supported upon said turret for moving one of said molds with respect to the other, a fluid flow control valve associated with said motor, a circular non-rotatable cam ring associated with said valve, a valve control arm extending from said valve into engagement with said cam ring, means for rotatably indexing the turret, said valve means being operated by the indexing motion of said turret with respect to said cam ring to control the direction of fluid flow through said hydraulic motor.

32. A machine for the injection molding of plastic materials comprising a turret, means rotatably and reciprocably supporting said turret, a hydraulic motor for elevating said turret, means for indexing said turret while elevated, a plurality of molds carried by said turret, a plastic injection unit reciprocably supported with respect to said turret and said molds, an injection plunger reciprocable in said injection unit, a hydraulic motor associated with said molds for closing the same prior to injection of plastic material therein by said injection unit and for opening the molds after the material is injected thereinto, a hydraulic motor for advancing said injection unit into engagement with said molds prior to injection and retracting said unit from said molds after injection, a hydraulic motor for operating said injection plunger of said injection unit while said unit is in engagement with one of said molds, a cycle control mechanism for said plunger motor, a hydraulic motor for applying clamping pressure upon said molds during injection of plastic material thereinto, a hydraulic system including means for delivering fluid at a relatively constant pressure for actuating the mold opening and closing hydraulic motor operated in response to indexing of said turret, a hydraulic system having a relatively constant pressure for actuating said injection plunger operated in response to said cycle control mechanism, and a hydraulic system having a relatively constant pressure operated in response to completion of a cycle of operation of said cycle control mechanism for actuating said turret elevating motor, said injection unit advancing motor and said clamping motor.

33. A machine for the injection molding of plastic materials comprising a turret, means rotatable and reciprocably supporting said turret, a hydraulic motor for elevating said turret, means for indexing said turret while elevated, a plurality of molds carried by said turret, a plastic injection unit reciprocably supported with respect to said turret and said molds, an injection plunger reciprocable in said injection unit, a hydraulic motor associated with said molds for closing the same prior to injection of plastic material therein by said injection unit and for opening the molds after the material is injected thereinto, a hydraulic motor for advancing said injection unit into engagement with said molds prior to injection and retracting said unit from said molds after injection, a hydraulic motor for operating said injection plunger of said injection unit while said unit is in engagement with one of said molds, a cycle control mechanism for said plunger motor, a hydraulic motor for applying clamping pressure upon said molds during injection of plastic material thereinto, a hydraulic system having a relatively constant pressure for actuating the mold opening and closing hydraulic motor operated in response to indexing of said turret, a hydraulic system having a relatively constant pressure for actuating said injection plunger operated in response to said cycle control mechanism, a hydraulic system including means for delivering fluid at a relatively constant pressure operated in response to completion of a cycle of operation of said cycle control mechanism for actuating said turret elevating motor, said injection unit advancing motor and said clamping motor, and electrical switch means actuated by said turret upon elevation thereof for initiating sequential operation of a series of electrical switch circuits for controlling cyclic operation of said hydraulic systems.

34. A machine for molding plastic materials comprising a base, a turret, molds carried by said turret, a plastic injection unit supported upon said base and associated with said turret, a ram positioned above said turret for applying pressure upon said molds, and a plurality of columns extending upwardly from said base supporting said ram in alignment with one of said molds, one of said columns supporting said turret for rotation thereon to permit said molds to be successively aligned with said ram.

35. A plastic injection machine comprising a bed, a plastic injection unit, means reciprocably mounting said unit upon said bed, a vertically acting ram, a plurality of columns extending upwardly from said bed for supporting said ram above said bed, a turret journaled upon one of said columns, hydraulically actuated means for elevating said turret upon said column, and means for rotatably indexing said turret while elevated.

REIDER THORESON.
WALTER ERNST.